UNITED STATES PATENT OFFICE.

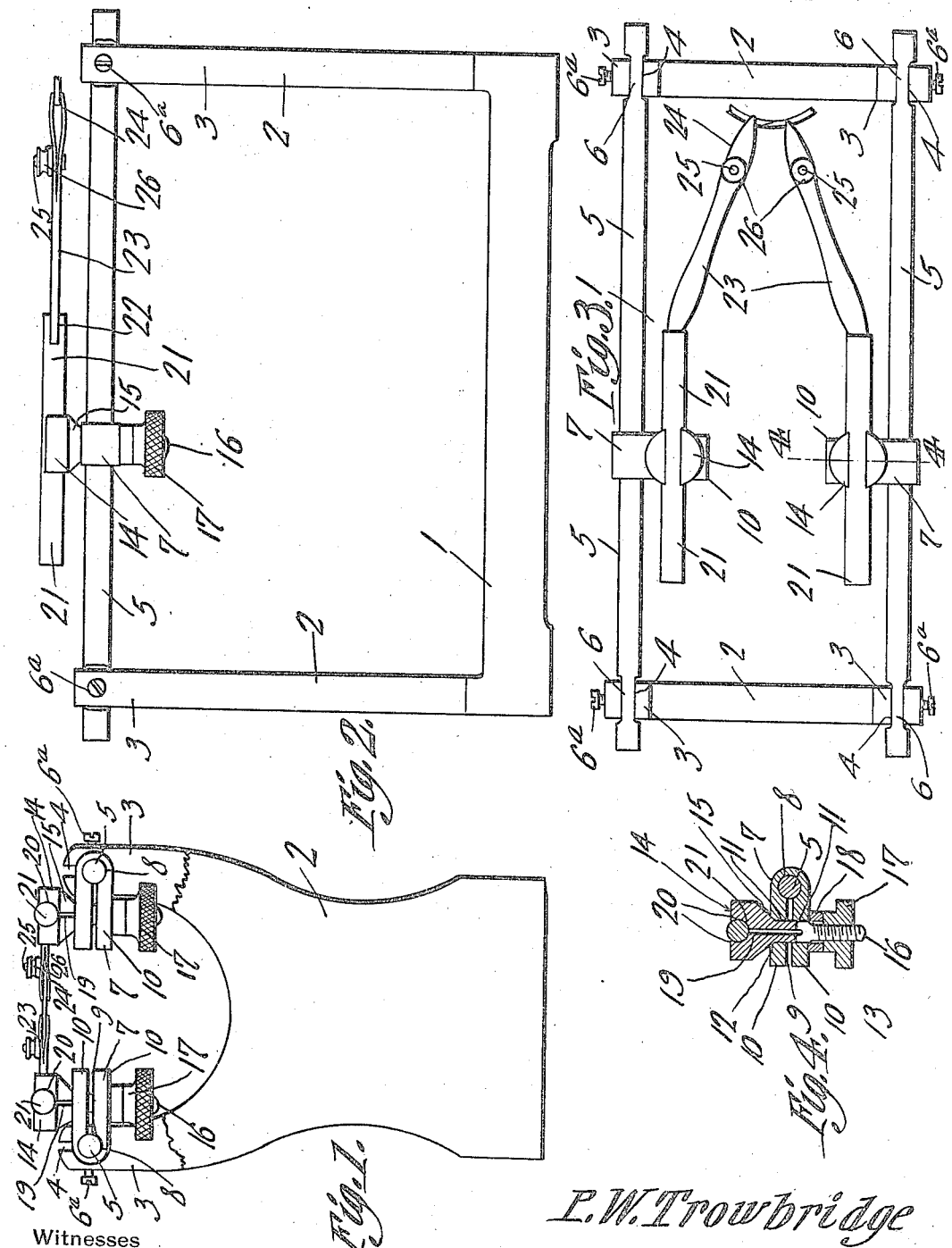

PAUL W. TROWBRIDGE, OF FRANKLIN, LOUISIANA.

SOLDERING-VISE.

1,239,233.        Specification of Letters Patent.      Patented Sept. 4, 1917.

Application filed April 1, 1916, Serial No. 88,355. Renewed February 5, 1917. Serial No. 146,859.

*To all whom it may concern:*

Be it known that I, PAUL W. TROWBRIDGE, a citizen of the United States, residing at Franklin, in the parish of St. Mary and State of Louisiana, have invented a new and useful Soldering-Vise, of which the following is a specification.

The present invention appertains to vises, and aims to provide a novel and improved device adapted especially for use by dentists, jewelers, and other artisans doing delicate work, the device being of such a construction that two pieces or parts to be soldered or otherwise operated upon can be conveniently held in the desired position relative to one another.

It is the object of the invention to provide simple yet effective means for adjustably supporting tweezers or clamps, whereby they can be held rigidly at various positions and angles relative to one another, to accommodate the work at hand, and without necessitating the adjustment of but few screws or equivalent securing elements.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is an end view of the device, portions being broken away.

Fig. 2 is a side elevation of the device.

Fig. 3 is a plan view thereof.

Fig. 4 is a sectional detail taken on the line 4—4 of Fig. 3.

In carrying out the invention, there is provided a suitable frame 1 having the ends 2 provided with the spaced arms 3, each end having a pair of said arms. The frame 1 can be supported in any suitable manner, and can be mounted in any desired position. The ends of the arms 3 have slots 4, and a pair of parallel longitudinal rods 5 are provided adjacent to their ends with reduced flattened portions 6 seating in said slots 4, and set screws 6ª are preferably carried by the arms 3 to secure the flattened portions 6 of the rods within the slots. The rods can be readily removed when the set screws are loosened, and said rods are of circular cross section.

Mounted upon each of the rods 5 for longitudinal and rotary adjustment, is a clamp 7. This clamp 7 has a bore 8 receiving the rod 5, and has a slot 9 extending from the bore 8 to one end of the clamp 7, the bore 8 being arranged adjacent to the opposite end. This slot 9 provides the wings or tongues 10 which are normally spaced apart, and which when forced together cause the clamp to grip the rod 5, to hold the clamp in its adjusted position, either longitudinally of the rod, or angularly relatively thereto. The tongues 10 have alining apertures 11, one of which is countersunk, as at 12, and the shank 13 of a second clamp fits rotatably and slidably within the apertures 11. The second clamp has an enlarged head 14 from which the shank 13 projects, and said head has a tapered or frusto-conical shoulder 15 seating within the countersunk portion 12 of the respective aperture 11. The shank 13 has a threaded terminal 16 upon which is threaded a thumb nut 17, it being preferable to provide a washer 18 upon the shank or stem 13 between the nut 17 and clamp 7.

The head 14 has a longitudinal diametrical slot 19 extending well into the shank 13, which divides said head into two parts or jaws that are normally spaced and resilient, the same as the tongues 10. The adjacent faces of said jaws are provided adjacent their free ends with complementing grooves 20 arranged at right angles with the axis of said head and its shank.

A pair of shanks 21 of circular cross section is carried by the heads 14, said shanks being disposed for longitudinal and rotary adjustment between the grooves 20, and each being provided at one end with a bifurcation or slot 22 for the reception of the shank of a tweezer or clamp 23 having the jaws 24 for holding the piece or part to be soldered to another one held by the other tweezer or clamp. The jaws 24 can be forced toward one another by means of a screw 25 engaged therethrough and upon which a nut 26 is threaded, whereby said jaws can be made to clamp the article disposed therebetween. The tweezers 23 can be secured to the shanks 21 in any suitable manner.

In using the vise, the two pieces which are to be soldered or otherwise operated upon are applied to the tweezers 23, which can be adjusted to proper positions for holding said pieces together properly for soldering. To adjust the tweezers, the nuts 17 are loosened, whereby the jaws of the heads 4 in springing apart will loosen the shanks 21, and the heads 14 and nuts 17 being separated, will loosen the clamps 7 as well as the shanks 13. It is therefore possible to adjust the clamps 7 longitudinally of the rods 5, and to turn said clamps upon said rods to bring them to the desired positions. The heads 14 can be rotated relative to the clamps, and the shanks 21 can be slid longitudinally and rotated relative to the heads 14. Therefore, in view of the adjustments of the clamps 7, heads 14 and shanks 21, it is possible to place the tweezers at many different angles and positions relative to one another, according to the work being done. The clamps 7, clamp heads 14, and shanks 21 are readily held in their adjusted positions, by simply tightening the nuts 17. Thus, when one nut 17 is tightened, it draws the shank 13 through the apertures 11, and springs the tongues 10 toward one another, causing the clamp 7 to tightly embrace the rod 5 to hold said clamp in position. At the same time, the frusto-conical portion 15 of the head 14 being drawn within the countersunk portion 12, will force the jaws of said head toward one another, to cause them to grip the shank 21 to hold said shank in its adjusted position, and the tongues 10 being clamped between the head 14 and nut 17, will hold said head 14 in position relative to the clamp.

The present device provides a convenient and handy one for soldering or otherwise operating upon small articles, and is especially intended for use by dentists, jewelers, etc.

Having thus described the invention, what is claimed as new is:

1. In a device of the character described, a rod, a clamp adjustable thereon, a second clamp carried for rotary adjustment by the first mentioned clamp, and an adjustable shank carried by the second mentioned clamp and having means for holding an article, and means engaging the second mentioned clamp for holding it in position relative to the first mentioned clamp, the clamps being so constructed that when said means is tightened, the first mentioned clamp will be held in place upon the rod, and the second mentioned clamp will grip said shank.

2. In a device of the character described, a rod, a clamp adjustable longitudinally and rotatably thereon, a second clamp having a shank journaled in the first mentioned clamp, a nut threaded upon said shank for securing the second mentioned clamp in place relative to the first mentioned clamp and simultaneously securing the first mentioned clamp upon said rod, and a shank carried by the second mentioned clamp for longitudinal and rotary adjustments, the last mentioned shank having means for holding an article, and the second mentioned clamp having means receiving the last mentioned shank and operable to grip the last mentioned shank when the nut is tightened.

3. In a device of the character described, a rod, a clamp fitted thereon having spaced resilient tongues which when pressed toward one another cause the clamp to grip the rod, said tongues having apertures, a head having a shank journaled through said apertures, a nut threaded upon said shank to force said tongues toward one another and to hold said head in position, said head being divided to provide jaws which are forced toward one another when said nut is tightened, and a shank disposed between said jaws to be gripped thereby and having means for holding an article.

4. In a device of the character described, a rod, a clamp slidable and rotatable thereon, having a pair of spaced resilient tongues which when moved toward one another will cause the clamp to grip said rod, said tongues having alining apertures, one aperture being countersunk, a head having a shank projecting through said apertures, said head having a frusto-conical shoulder fitting in said countersunk aperture, a nut threaded upon the shank, said head being provided with a slot extending into said shank and providing a pair of resilient jaws, said jaws having complementing grooves arranged at an angle to the axis of said head and shank, and a shank fitting rotatably and slidably between said grooves and having means for holding an article.

In testimony that I claim the foregoing as my own, I have hereto affixed my signature in the presence of two witnesses.

PAUL W. TROWBRIDGE.

Witnesses:
T. F. FRERE,
F. A. BAUDREAUX.

Copies of this patent may be obtained for five cents each, by addressing the "Commissioner of Patents, Washington, D. C."